US005281945A

United States Patent [19]

Keppner et al.

[11] Patent Number: 5,281,945

[45] Date of Patent: Jan. 25, 1994

[54] CONTROL APPARATUS PARTICULARLY ADAPTED FOR HANDICAPPED PERSONS

[75] Inventors: Louis A. Keppner, Vernon; Ramon L. Lecours, South Windsor, both of Conn.

[73] Assignee: Magicorp, Inc., Vernon, Conn.

[21] Appl. No.: 839,177

[22] Filed: Feb. 21, 1992

[51] Int. Cl.[5] .......................... G05B 1/03; G06F 7/04; E05B 63/00

[52] U.S. Cl. .................................. 340/146.2; 70/404; 70/413; 341/21

[58] Field of Search ...................... 307/350; 340/146.2; 70/404, 407, 413; 324/71.1, 226; 341/16, 20, 21, 22

[56] References Cited

U.S. PATENT DOCUMENTS 3,987,345 10/1976 Kato ................................ 340/146.2
4,022,038 5/1977 Miller ................................... 70/413
4,392,134 7/1983 Lutz ..................................... 70/413
4,408,192 10/1983 Ward et al. ........................... 341/21
4,838,060 6/1989 Hutzelaub ............................. 70/404
5,006,842 4/1991 Tobol ................................... 341/22

*Primary Examiner*—John Zazworsky
*Attorney, Agent, or Firm*—Robert S. Smith

[57] ABSTRACT

A control apparatus which includes apparatus for storing a first digital code, apparatus for storing a second digital code, and apparatus for comparing the first and second digital codes, the apparatus for comparing including first and second generally dish shaped members that are dimensioned and configured for nesting relationship. In some forms of the invention the dish shaped members are each rotationally symmetrical. The first and second dish shaped members may each include a plurality of steps on the face thereof. At least one of the first and second dish shaped members includes a plurality of steps on the face thereof. The other of said first and second dish shaped members may includes a plurality of steps on the face thereof.

14 Claims, 6 Drawing Sheets

CONTROL APPARATUS PARTICULARLY ADAPTED FOR HANDICAPPED PERSONS

BACKGROUND OF THE INVENTION

The invention relates to control apparatus and particularly to apparatus of this type that is particularly adapted to use by physically handicapped persons. While the invention will be described in terms of apparatus for locking the door of a building, it will be understood that the invention has application to exterior and interior building doors as well as other locking apparatus on cabinets, trunks, computer security devices, and just about any where that locks are customarily used.

In addition those skilled in the art will understand that many other devices may be operated by the present apparatus. For example, the device does not even have to be a lock. The apparatus in accordance with the invention may be coupled to an elevator control system so that the elevator will come to a specific floor to receive a person and then automatically take the occupant to a specific floor. The access to the destination floor may even be limited to those having such an electronic key. The same apparatus may also be used to operate apparatus as varied as a missile launcher, a valve in a process control system or a wide variety of other applications. The scope of applications is limited only by ones imagination.

The prior art includes a variety of locking apparatus that use digital techniques. For example, magnetic stripes on cards are often used to operate hotel room locks. Such locks may be easily reprogrammed for new room occupants.

It is an object of the invention to provide a construction that will be easy to operate by persons having motor skills that are less extensive than the motor skills of the average person.

It is another object of the invention to provide apparatus that will be very, very difficult for someone who does not possess a valid key module to deceive and thus gain entrance to the locked apparatus.

It is an object of the invention to provide apparatus which is inexpensive to manufacture.

Still another object of the invention is to provide apparatus that will be easy to assemble.

SUMMARY OF THE INVENTION

It has now been found that these and other objects of the invention may be attained in a control apparatus which includes means for storing a first digital code, means for storing a second digital code, and means for comparing the first and second digital codes, the means for comparing including first and second generally dish shaped members that are dimensioned and configured for nesting relationship.

In some forms of the invention the dish shaped members are each rotationally symmetrical. One of said dish shaped members may include a plurality of steps on the face thereof. At least one of the first and second dish shaped members may include a plurality of steps on the face thereof. The other of said first and second dish shaped members may include a plurality of steps on the face thereof.

In some forms of the invention at least one of the dish shaped members includes a plurality of generally planar members. The plurality of generally planar members may be alternately conductive and insulating materials. Conductive springs may be disposed in contact with respective conductive generally planar members.

In some forms of the invention at least some of the generally planar members include bores therein for receiving the springs. The other of the dish shaped members includes a plurality of elongated contacts and means for mounting the plurality of elongated contacts with respective generally planar members in the one dish shaped member. Each of the elongated contacts may be spring biased axially.

BRIEF DESCRIPTION OF THE DRAWING

The invention will be better understood by reference to the accompanying drawing in which.

DESCRIPTION OF THE PREFERRED EMBODIMENT

Figure 1:
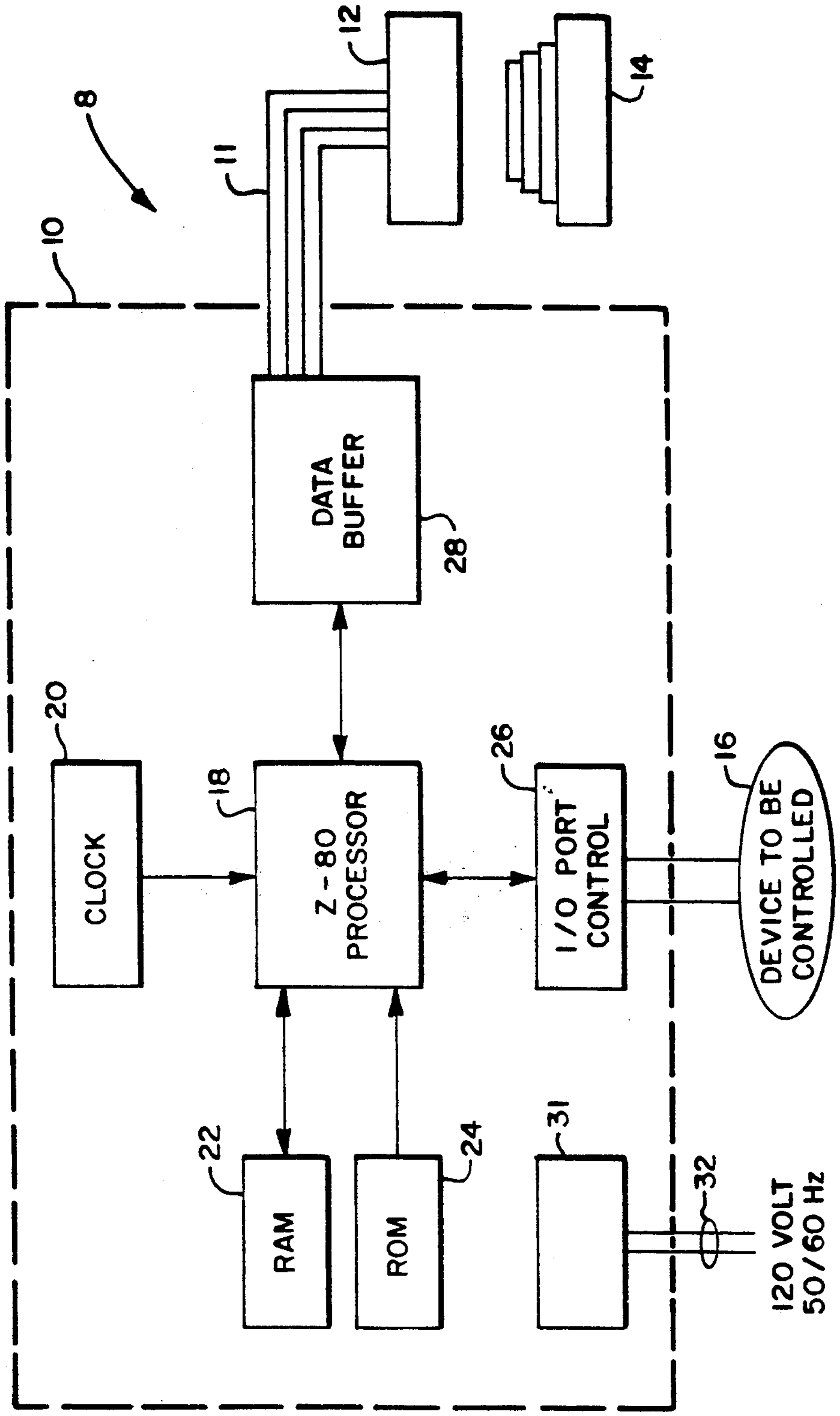
FIG. 1 is a partially schematic drawing illustrating the overall system in accordance with one form of the invention.
Figure 2:
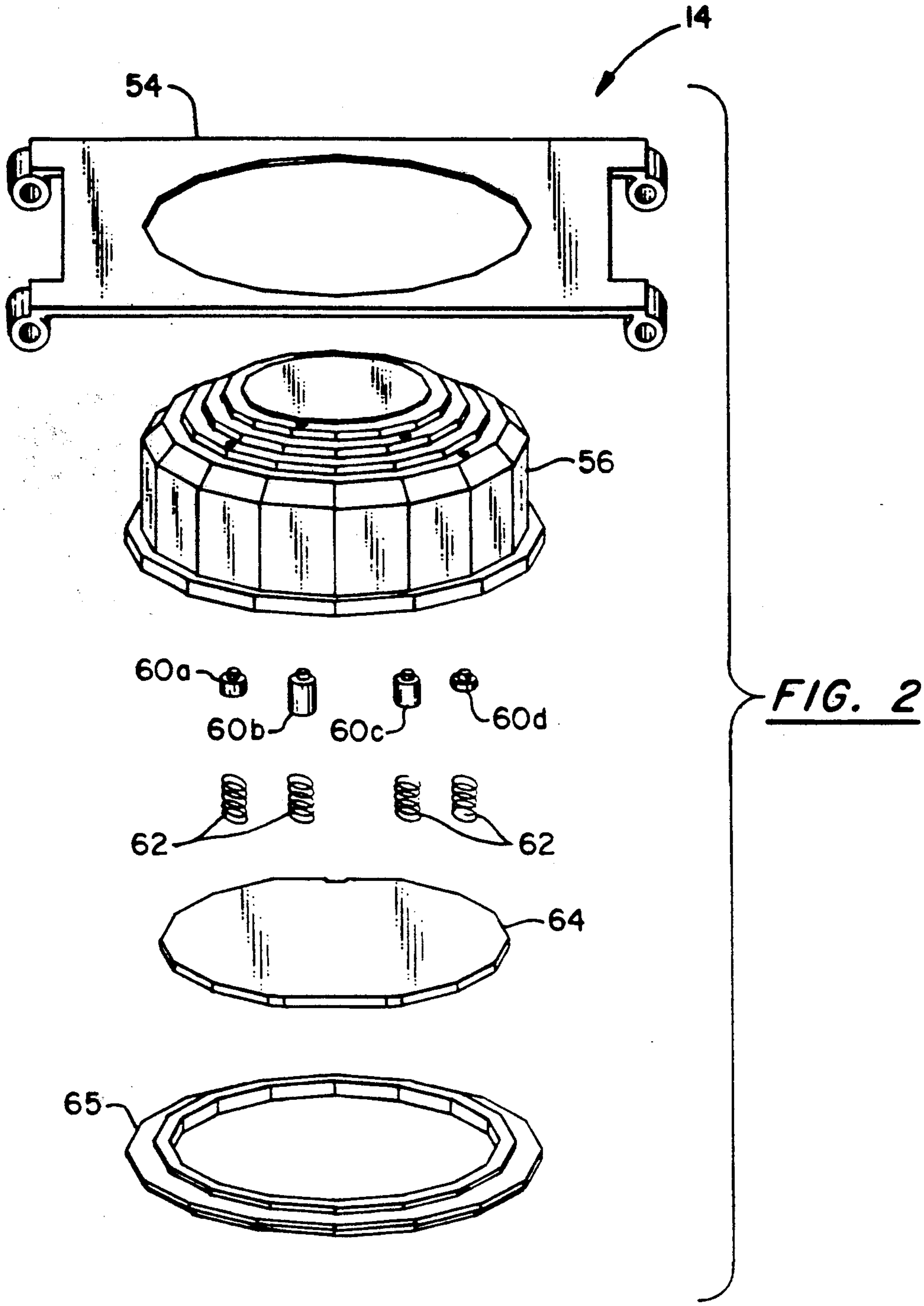
FIG. 2 is a partially schematic exploded view of the key module shown in FIG. 1.

Referring now to FIGS. 1–8 there is shown a schematic of one form of the entire apparatus 8. The control apparatus 8 includes a control module 10 that is connected by a cable 11 to a key receptacle 12. Ordinarily, the control module 10 is mounted on an interior wall of the building or room secured by the apparatus 8. The key receptacle 12 is, in the preferred embodiment, generally dish shaped or concave. The key receptacle 12 ordinarily will be mounted on the outer portion of the door frame (not shown) of the door that is secured by the apparatus 8.

The apparatus also includes a key module 14 that is dimensioned and configured for mating engagement with the key receptacle 12. The key module 14 is generally convex in the preferred form of the invention. The respective concave and convex shapes allow the user to engage the key receptacle 12 and key module 14 without the need for a specific relative angular orientation. Ordinarily the key module 14 is strapped on the wrist of user. In other forms of the invention the key module 14 may be sewn on the clothing of the user or even secured in place with screws that engage an arm or leg prosthetic device on the user.

Although the respective dish shapes as shown in the drawings are preferred it will be understood that a plurality of contacts may even be arrayed in respective rectilinear arrays on respective keys and receptacles. This form of the invention will require the user to have greater motor skills than the illustrated embodiment.

For many applications the apparatus in accordance with the invention will operate an electric strike 16. Such devices are known in the art and typically constitute a stop that is movable by a solenoid between a first position that prevents the bolt or latch from moving away from a closed door position to an open door position. Some embodiments of the invention may also include an automatic door opener that is also coupled to the I/O port control 26. As noted above those skilled in the art will understand that many other devices may operated by the present apparatus. For example, the device does not even have to be a lock. The scope of applications is limited only by ones imagination.

The control module 10 in the preferred embodiment includes a Z-80 microprocessor 18. The Z-80 microprocessor 18 is fed a clock pulse provided by a clock 20 and is coupled to ROM 24 that has a unique numeric password stored therein. The ROM 24 has software stored therein and is also coupled to the Z-80 microprocessor 18. An I/O port control 26 is coupled to the electric strike 16. The I/O port control 26 may include means for producing a signal strong enough to operate the electric strike 16 in response to a relatively low level signal from the Z-80 microprocessor 18. The Z-80 microprocessor 18 is also coupled to a data buffer 28 that isolates the Z-80 microprocessor 18 from external influences from outside the control module 10 except for those passing via the cable 11 and key receptacle 12. A power supply 31 for the module is connected to external power 32. Various resistors and capacitors may be provided to absorb spikes. RAM 22 is provided as a scratch pad for the Z-80 microprocessor 18.

The Z-80 microprocessor 18 sends pulses to key receptacle 12 through the data buffer 28. These pulses pass to the key module 14. In response to these pulses the counter (not shown) in the key module 14 increments the address to the next data bit stored in the PROM. The PROM then passes the next data bit of the password back to the Z-80 microprocessor 18 through the data buffer 28. The number of data bits passed determine the possible number of password combinations or passwords. For example, using 32 data bits 4.2 billion combinations can be realized. Those skilled in the art will recognize that the possible combinations are only limited by the number of data bits and that other forms of the apparatus may employ other storage techniques such as a serial PROM.

In operation the Z-80 microprocessor 18 compares the data in the PROM which is in the key module 14 to the data in the ROM 24. If the respective data are identical the electric strike 16 is operated by the Z-80 microprocessor 18.

In the preferred embodiment of the invention the key receptacle 12 and the key module 14 must have the capability of establishing four separate electrical power paths. More specifically, there are first and second paths for electrical power since it is preferable that no power be provided from within the key module 14. In other words it is preferable that the user not even have to carry a battery. Third and fourth paths are utilized respectively for clock pulses and data.

In other forms of the invention the apparatus may include a PAL (programmable array logic). In each case the apparatus will compare data in the control module 10 to data in the key module 14.

Figure 8:
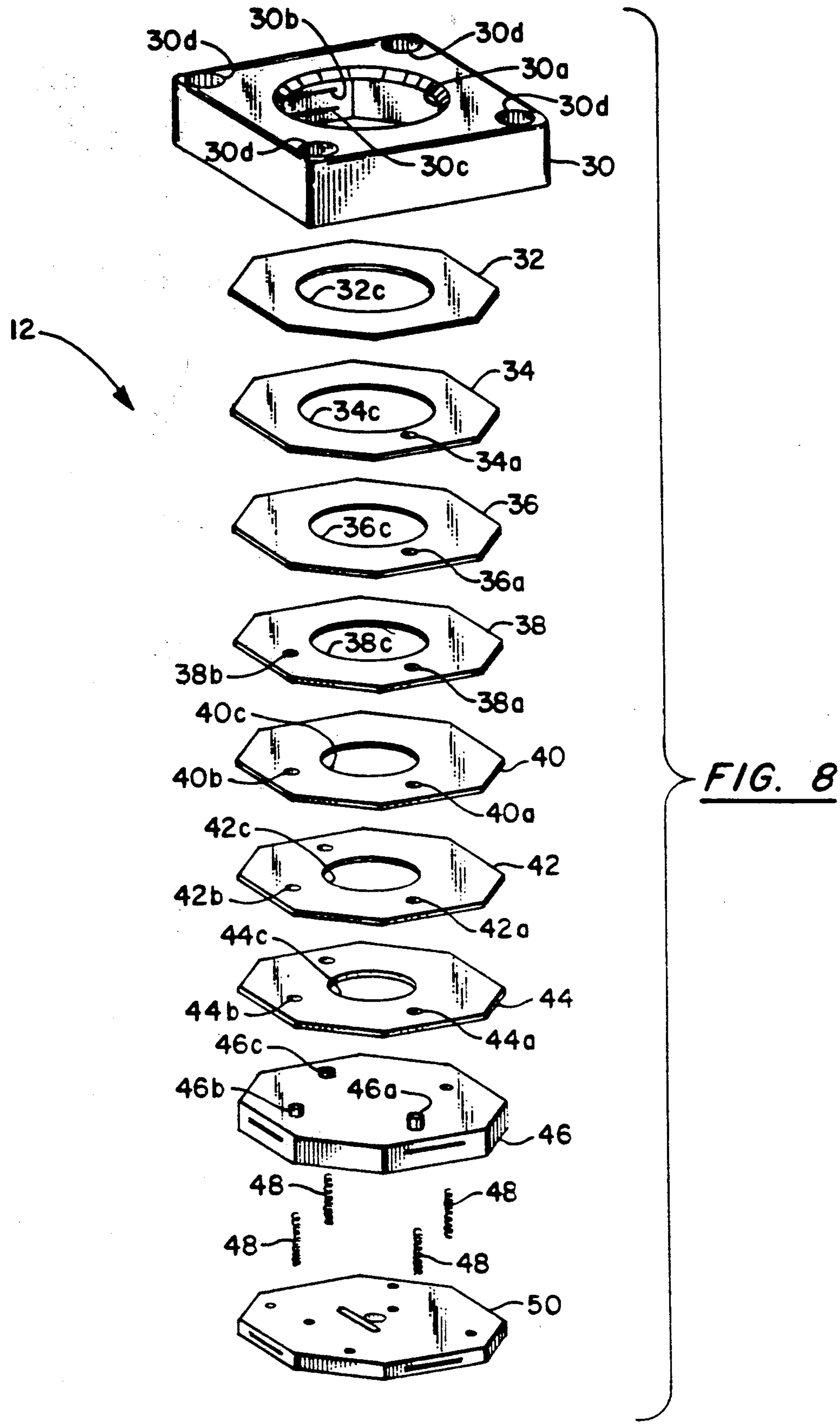
FIG. 8 is an exploded view of the key receptacle shown in FIG. 5.

As best seen in FIGS. 5–8 the key receptacle 12 comprises an outer shell 30 having a recess 30*a* in which are disposed successive generally planar members. More specifically the respective planar members are a first layer 32 (a brass layer), a second layer 34 (an insulating layer), a third layer 36 (a brass layer), a fourth layer 38 (insulating layer), a fifth layer 40 (a brass layer), a sixth layer 42 (an insulating layer), a seventh layer 44 (a brass layer), spring retainer/wireway 46, and a locking member 50. The cable 11 extends into a groove 47 in the spring retainer/wireway 46. In the preferred embodiment the insulating layers are plastic. All layers are approximately 0.016 inches thick. It will be understood that the greater the slope of the meshing faces the easier the alignment for the user. Conversely the less the slope the greater the compactness of the apparatus. Four springs 48 extend from the groove 47 to respectively the first layer 32, third layer 36, fifth layer 40 and seventh layer 44. In this manner electric continuity is maintained between respective conductors of the cable 11 and respectively the negative power, positive power, return data and clock pulses to the first layer 32, third layer 36, fifth layer 40 and seventh layer 44. As best seen in FIG. 8 one of the springs 48 extends from the groove 47 through the holes 44*a*, 42*a*, 40*a*, 38*a*, 36*a* and 34*a* in respectively seventh layer 44, sixth layer 42, fifth layer 40, fourth layer 38, third layer 36, and second layer 34 to make contact with the first layer 32. Insulators 46*a*, 46*b*, 46*c* are part of locking member 46 and prevent unintentional contact of respective springs 48 with conductive plates. Similarly, another spring 48 extends from the groove 47 through holes 44*b*, 42*b*, 40*b*, and 38*b* in respectively seventh layer 44, sixth layer 42, fifth layer 40, fourth layer 38 to make contact with the third layer 36.

In a similar manner each of the other two of the four springs 48 establishes continuity to another conductor in the cable 11 and respectively the fifth layer 40 and the seventh layer 44. The spring retainer/wireway 46 includes peripheral radially extending ribs that are dimensioned and configured to snap into grooves that are disposed on each of the four faces of the recess 30*a*. In this manner the spring retainer/wireway 46 is secured in place within the outer shell 30. The locking member 50 also is provided with peripheral ribs that are dimensioned and configured to snap into engagement with grooves 30*c*. Four stepped cross-section bores 30*d* are provided in the outer shell 30 to allow mounting. As noted above the mounting preferably is on the outside of the door frame in a typical installation.

As best seen in FIG. 8 the centrally disposed apertures 32*c*, 34*c*, 36*c*, 38*c*, 40*c*, 42*c*, and 44*c* in respectively first layer 32, second layer 34, third layer 36, fourth layer 38, fifth layer 40, sixth layer 42 and seventh layer 44 are progressively of smaller diameter to produce a dish shaped or concave opening.

Cooperating with the dish shaped or concave opening is a domed shaped or convex head or case 56 of the key module 14. The key module 14 includes a mounting plate 54 that is constructed with journals 54*a* to engage pins and a strap (not shown) as with the conventional wrist watch. The case 56 is provided with a plurality of steps 56 *a* and a chamfer 56*b* to precisely mate with the key receptacle 12.

Figure 3:
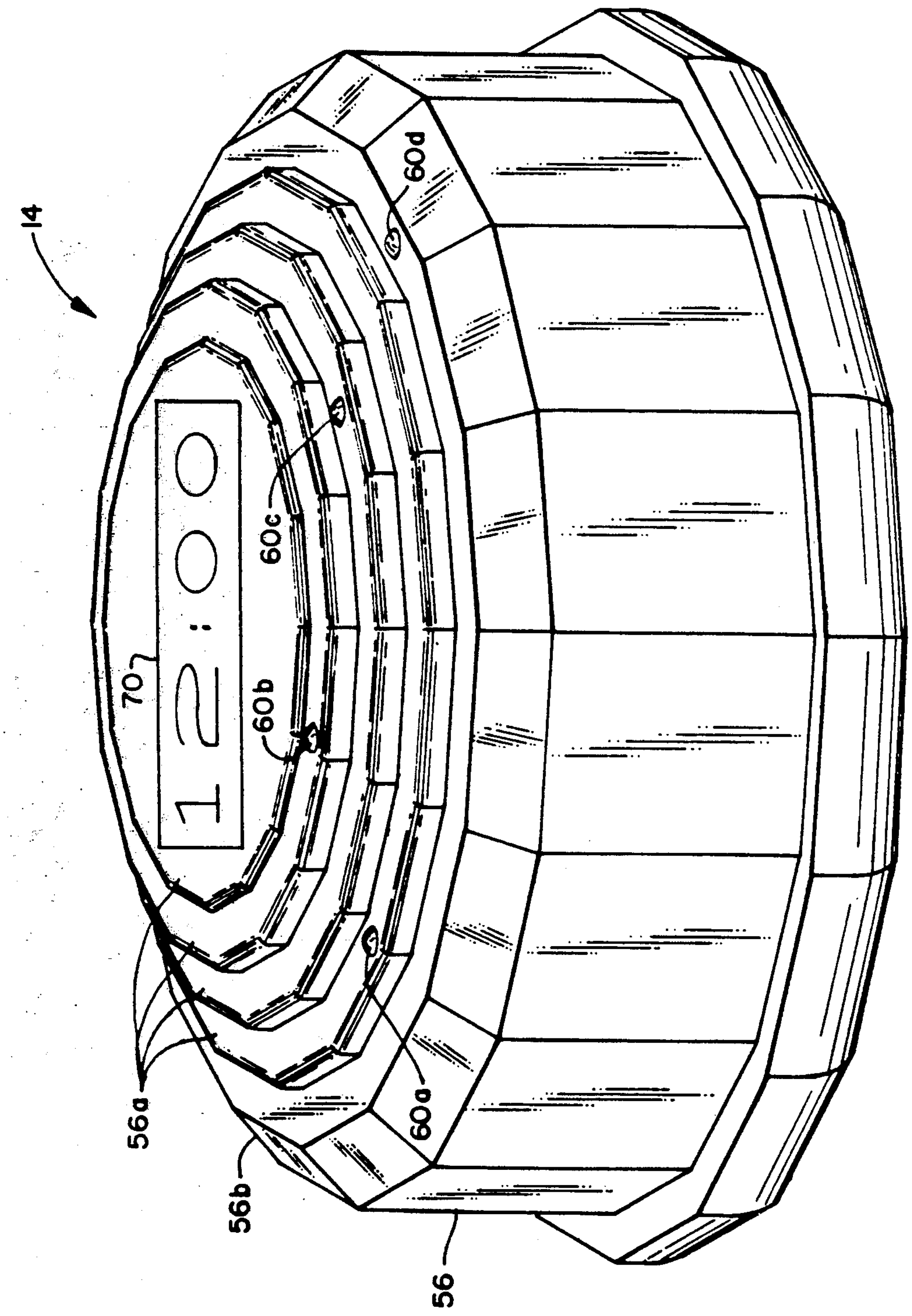
FIG. 3 is a partially schematic view to an enlarged scale of the head of the key module shown in FIG. 2.
Figure 4:
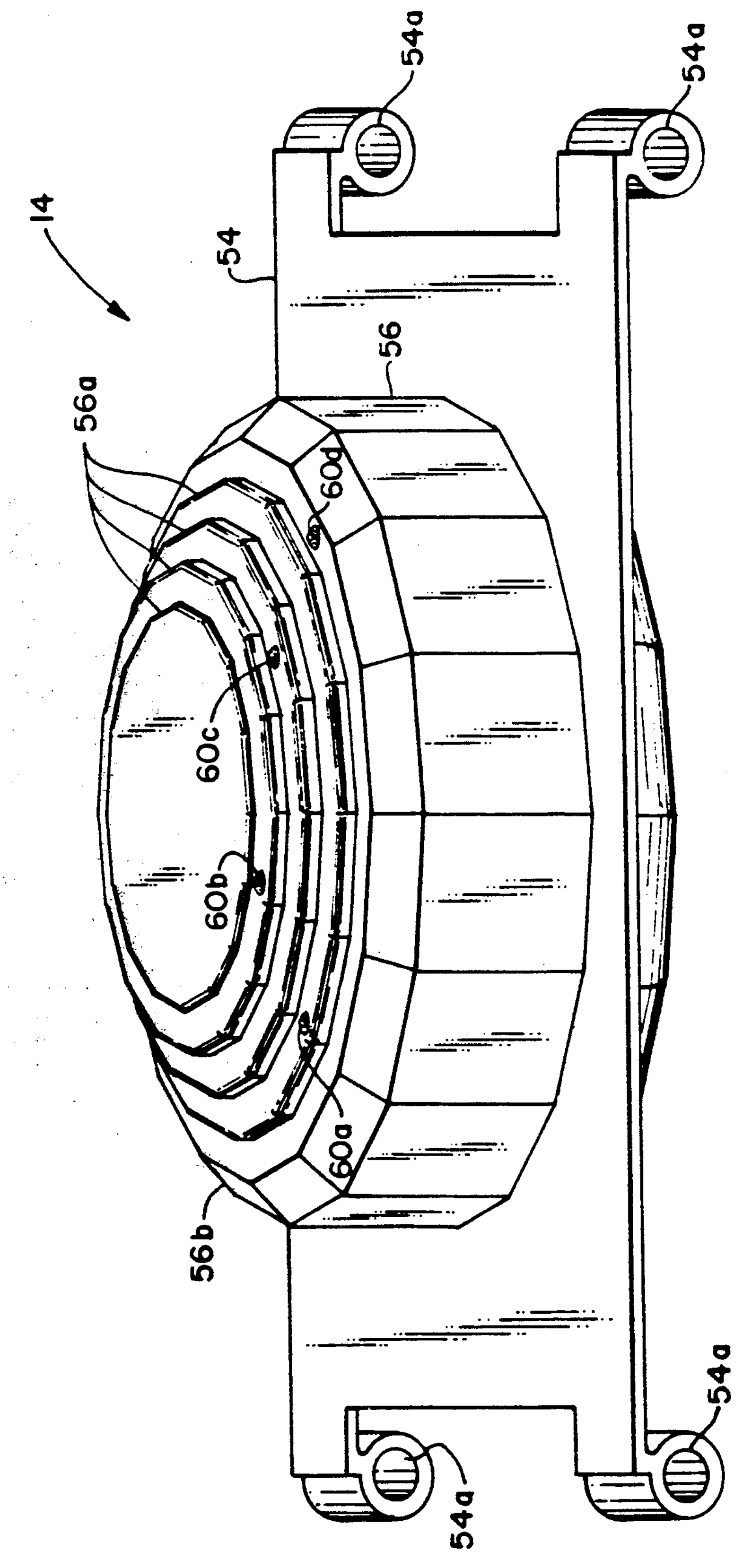
FIG. 4 is a perspective view of the assembled key module shown in FIG. 2.
Figure 5:
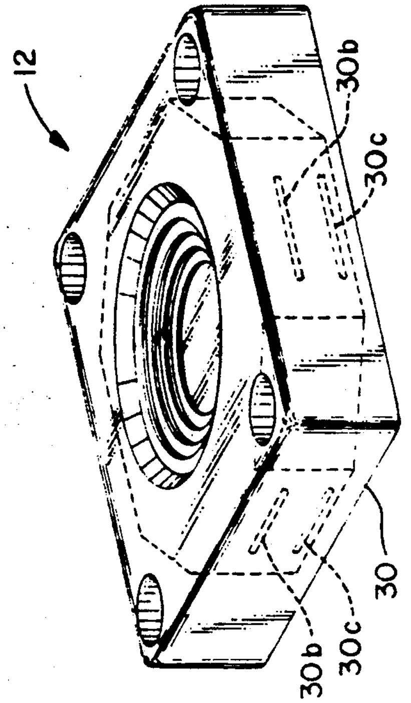
FIG. 5 is a perspective view of the assembled key receptacle shown in FIG. 1.
Figure 6:
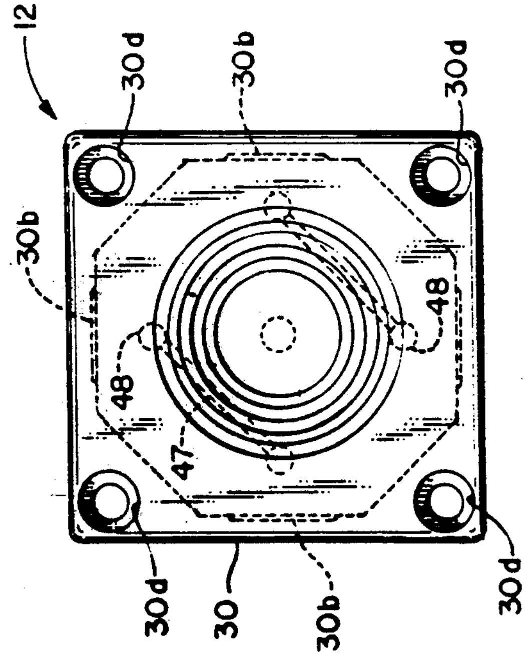
FIG. 6 is a partially schematic plan view of the key receptacle shown in FIG. 5.
Figure 7:
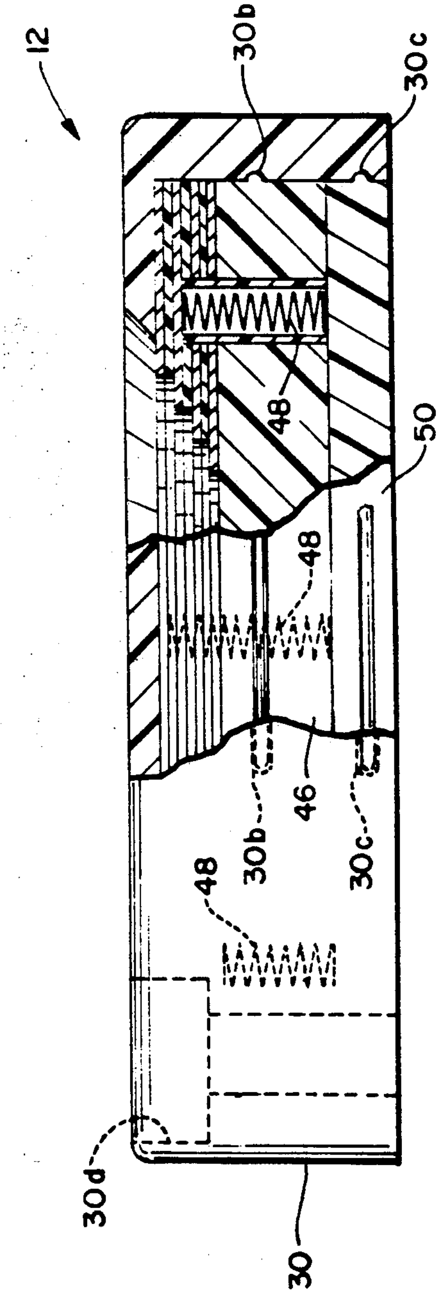
FIG. 7 is a partially schematic elevational view of the key receptacle shown in FIG. 5.

The key module 14 is provided with four pins 60*a*, 60*b*, 60*c*, and 60*d* of differing lengths. These pins are spring biased by springs 62 to provide engagement with the brass layers in the key receptacle 12. As best seen in FIG. 3 the pins 60*a*–60*d* extend through the outer face of the case 56. In some forms of the invention the case 56 may carry a digital watch 70 in the center thereof.

The shape of the case 56 is generally rotationally symmetrical and thus the angular orientation of the case 56 is immaterial for satisfactory operation. A circuit board carrying only the counter and the PROM which as described above as being part of the key module 64 engages the springs 62. A closure member 65 secures the key module 14 together.

The invention has been described with reference to its illustrated preferred embodiment. Persons skilled in the art of such devices may upon exposure to the teachings herein, conceive other variations. Such variations are deemed to be encompassed by the disclosure, the invention being delimited only by the following claims.

Having thus described our invention we claim:

1. A control apparatus which comprises:
means for storing a first digital code;
means for storing a second digital code;
means for comparing said first and second digital codes, said means for comparing including first and second generally dish shaped members, said first and second generally dish shaped members including means that are dimensioned and configured for nesting relationship.

2. The apparatus as described in claim 1 wherein:
said dish shaped members are each rotationally symmetrical.

3. The apparatus as described in claim 2 wherein:
said means that are dimensioned and configured for nesting relationship comprises one of said dish shaped members having a first face thereon, said first face including a plurality of steps on the face thereof.

4. The apparatus as described in claim 3 wherein:
said means that are dimensioned and configured for nesting relationship comprises the other of said first and second dish shaped members having a second face having a plurality of steps on said second face thereof.

5. The apparatus as described in claim 4 wherein:
at least one of said dish shaped members includes a plurality of generally planar members.

6. The apparatus as described in claim 5 wherein:
said plurality of generally planar members are alternately conductive and insulating materials.

7. The apparatus as described in claim 6 wherein:
said apparatus includes conductive springs disposed in contact with respective conductive generally planar members.

8. The apparatus as described in claim 7 wherein:
at least some of said generally planar members include bores therein for receiving said springs.

9. The apparatus as described in claim 8 wherein:
the other of said dish shaped members includes a plurality of elongated contacts and means for mounting said plurality of elongated contacts with respective generally planar members in said one dish shaped member.

10. The apparatus as described in claim 9 wherein:
each of said elongated contacts is spring biased axially.

11. The apparatus as described in claim 2 wherein:
the other of said dish shaped members includes a plurality of elongated contacts and means for mounting said plurality of elongated contacts with respective generally planar members in said one dish shaped member.

12. The apparatus as described in claim 11 wherein:
each of said elongated contacts is spring biased axially.

13. The apparatus as described in claim 4 wherein:
the other of said dish shaped members includes a plurality of elongated contacts and means for mounting said plurality of elongated contacts with respective generally planar members in said one dish shaped member.

14. The apparatus as described in claim 13 wherein:
each of said elongated contacts is spring biased axially.

* * * * *